3,299,399
METHODS AND APPARATUS FOR INDICATING AN UNDERWATER PARAMETER IN A MARINE SEISMIC SYSTEM

William E. Bowers, Houston, Tex., assignor to Vector Cable Company, Houston, Tex., a corporation of Texas
Filed Dec. 2, 1965, Ser. No. 511,076
8 Claims. (Cl. 340—7)

This invention relates to seismic survey equipment and more particularly to marine seismic survey equipment.

In marine seismic survey work, it is customary to employ a cable carrying a number of detectors at different points along the length of the cable which detectors are sensitive to seismic signals. In the usual apparatus, a set of pick-up devices or hydrophones are evenly spaced along the length of a floating cable which is pulled along behind a ship. In operation, an explosive charge is detonated in a hole in the earth, on the ocean bottom, or in the water near the surface of the ocean at a point offset from the middle of the spread of detectors. Shock waves from the explosion are reflected back to the hydrophones from earth formations, and the resultant signals are recorded.

However, one problem which occurs in oceanographic surveys is that the cable and thus the hydrophones will fall below the surface of the ocean or will vary from a desired operating depth below the surface. Since, for accurate seismic data, the hydrophones are assumed to remain at the surface of the ocean, this change in depth will render the readings from the hydrophones inaccurate.

One manner in which this problem can be corrected is to determine the depth of the cable at different points along its length. One manner of determining this depth is to utilize strain gauge type pressure transducers at different points along the cable, which transducers will provide an indication of the depth since the depth at a point below the surface of the ocean is proportional to the pressure at that point. However, the strain gauge type pressure transducers utilize a high impedance in the impedance portion of the strain gauge and have relatively small changes in resistance for changes in pressure. The use of these strain gauge type pressure transducers leads to low level signals and complicated circuitry problems because of these low level signals.

Potentiometer type absolute pressure transducers having a much lower impedance and far greater changes in impedance for changes in pressure, are also available for determining pressure. Thus, since the potentiometer type absolute pressure transducers have a much lower impedance and a greater change in impedance than the strain gauge type pressure transducers, the use of the potentiometer type transducers would allow for higher signal levels.

However, other problems arise when high level signals are used for depth indicating purposes. Since the geophysical frequency is in the range of one-half cycle per second to one-hundred cycles per second, a low frequency alternating current signal having a high magnitude could not be used with the pressure transducers because of the problems of cross talk with the geophysical signals. On the other hand, if a higher frequency alternating current signal of high magnitude is used, the capacitive effects of the long cable may seriously affect the accuracy of the depth indicating system. On the other hand, if a high level direct current signal is utilized, there is a problem of electrolysis at the connecting pins between cable sections, which would cause errors in the depth indicating systems and serious deterioration of the plug contact points. If low amplitude signals are used, then the complicated circuitry problems arise, as in the strain gauge type pressure transducer case. These same problems would also affect using a high level signal to measure different underwater parameter other than depth.

It is therefore an object of the invention to provide new and improved methods and apparatus for determining the depth of a cable utilized in a marine seismic survey system.

It is another object of the invention to provide new and improved methods and apparatus for determining an underwater parameter in a marine seismic survey system wherein high magnitude direct current signals are utilized throughout the cable for the underwater parameter indicating apparatus.

It is still another object of the invention to provide new and improved methods and apparatus for accurately determining the depth of a cable in a marine seismic survey system, wherein high magnitude direct current signals are utilized for the depth indicating system in the cable and at the same time the seismic survey signals are unaffected by the depth indicating signals.

In accordance with the invention apparatus for indicating an underwater parameter in a marine seismic system comprises at least one parameter measuring device located at at least one point along the length of the cable and means for supplying a pulsating, polarity-reversing direct current signal to the parameter measuring device. The apparatus further comprises means responsive to the parameter measured by the parameter measuring device for providing an indication of the underwater parameter.

In accordance with another feature of the invention, a method of an underwater indicating parameter in a marine seismic system comprises (a) supplying a pulsating, polarity-reversing direct current signal to at least one parameter measuring device located at at least one point along the length of the cable; (b) modulating the pulsating, polarity-reversing direct current signal in accordance with the underwater parameter; and (c) providing an indication of the underwater parameter in response to the modulated signal.

For a better understanding of the present invention, together with other and further objects thereof, reference is had to the following description taken in connection with the accompanying drawings, the scope of the invention being pointed out in the appended claims.

Referring to the drawings.

Figure 1:
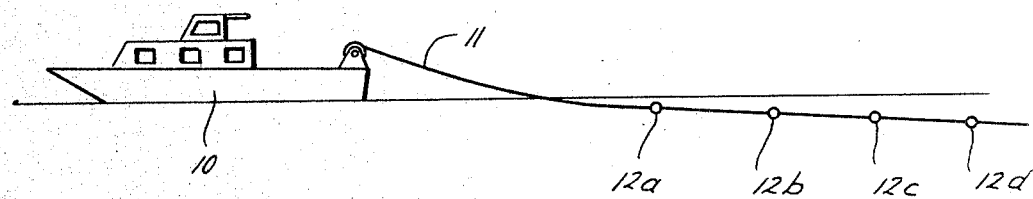
FIG. 1 represents a cable carrying pressure sensitive transducers trailing behind a boat.

Referring now to FIG. 1, there is shown a boat 10 trailing a cable 11 behind the boat 10. Located at different points along the cable 11 are pressure transducers 12a, 12b, 12c, and 12d. Hydrophones could conveniently be located at the same locations as the pressure sensitive transducers. Desirably, the cable 11 is supposed to remain at a given depth, as for example, floating at the surface of the ocean for accurate seismic information. However, as shown in FIG. 1, the cable 11 may fall below the surface of the ocean at various points along the cable 11.

Figure 2:
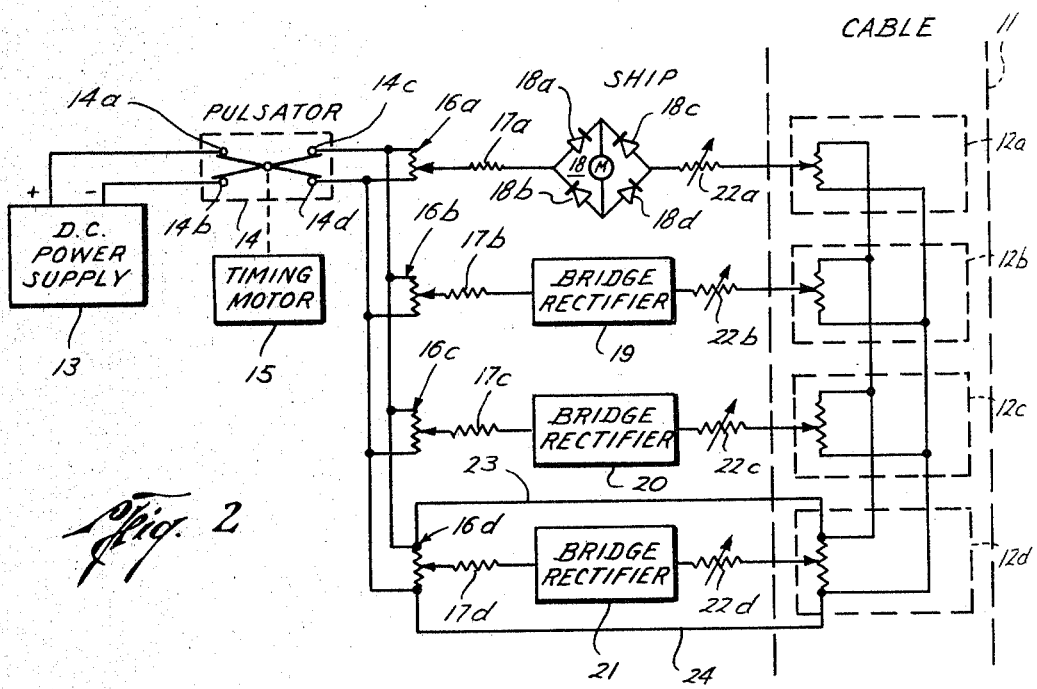
FIG. 2 represents schematically the depth indicating system of the present invention.

Looking now at FIG. 2, there is shown a system for accurately determining the depth at various points along the cable 11 without affecting the signals transmitted from the hydrophones along the cable 11 to the boat 10. A D.C. power supply 13 supplies power to terminals 14a and 14b of a pulsator 14. The pulsator 14 is driven by a timing motor 15. The output terminals 14c and 14d of pulsator 14 are connected in parallel across the resistance portions of potentiometers 16a, 16b, 16c, and 16d. The output terminals 14c and 14d of pulsator 14 are also connected in parallel via conductors 23 and 24 through cable 11 across the resistance portions of potentiometer type pressure transducers 12a, 12b, 12c, and 12d. These potentiometer type pressure transducers may be of the type shown in catalog No. Pts 1164 of Computer Instruments Corporation, 92 Madison Avenue, Hempstead, L.I., New York. The wiper arm of potentiometer 16a is connected through a fixed resistance 17a to the anode of a rectifier 18a and the cathode of a rectifier 18b. The cathode of rectifier 18a is connected to one side of a meter M and to the cathode of a rectifier 18c. The anode of rectifier 18b is connected to the other side of the meter M and to the anode of a rectifier 18d. The anode of rectifier 18c and the cathode of rectifier 18d are connected through a variable resistor 22a to the wiper arm of potentiometer type pressure transducer 12a. Rectifiers 18a, 18b, 18c, and 18d and meter M make up a full wave rectifier bridge circuit 18.

The wiper arms of potentiometers 16b, 16c, and 16d are connected through current limiting resistors 17b, 17c, and 17d to bridge rectifiers 19, 20, and 21 respectively. Bridge rectifiers 19, 20 and 21 are identical in construction to bridge rectifier 18. The other side of bridge rectifier 19, 20 and 21 are connected through variable resistors 22b, 22c and 22d to the wiper arms of potentiometer type pressure transducers 12b, 12c, and 12d.

Now concerning the operation of the apparatus of FIG. 2, D.C. power supply 13 provides a constant voltage D.C. signal to pulsator 14. Timing motor 15 drives the pulsator 14 at a given frequency of, for example, 2 cycles per minute. It can be seen that during one-half cycle of operation of pulsator 14, the positive terminal of D.C. power supply 13, on contact 14a, is supplied to contact 14d and during the next one-half cycle of operation, the positive terminal is connected to output terminal 14c. Likewise the negative terminal of D.C. power supply 13, on contact 14b, is supplied to contact 14c and 14d in succession. Thus, it can be seen that pulsator 14 supplies a pulsating, polarity-reversing, direct current signal.

The circuit comprising potentiometer 16a, resistor 17a, bridge rectifier circuit 18, variable resistor 22a, and potentiometer type pressure transducer 12a comprises a bridge circuit with the resistance portions of potentiometers 16a and potentiometer type pressure transducer 12a above and below the wiper arms thereof comprising the legs of the bridge circuit. The wiper arm of potentiometer 16a and variable resistor 22a are varied to calibrate the circuit. As the depth at the various portions along cable 11 vary, and thus as the pressure of the potentiometer type pressure transducer 12a varies, the transducer 12a modulates the pulsating, polarity-reversing direct current signal from pulsator 14, and the voltage between the wiper arm of pressure transducer 12a and potentiometer 16a will vary. As this voltage varies, the current through the meter M will vary proportionally. Thus the current through the meter M will be proportional to the depth of the cable 11 at that point where potentiometer type pressure sensitive transducer 12a is located. The remaining circuits operate in the same identical manner. Thus, the meter associated with bridge rectifiers 19, 20, and 21 will indicate the depth of pressure transducers 12b, 12c, and 12d respectively.

It can be seen that since a direct current signal is utilized, the problems of cross talk at the geophysical frequency and capacitive effects at higher frequencies above the geophysical frequency are avoided. The problem of electrolysis at the connecting pins between cable sections is avoided by use of the pulsator 14 since the current is traveling in one direction for a given length of time and is traveling in the opposite directon for an equal amount of time. Therefore, a high amplitude signal can be utilized with the pressure transducers, thus allowing the use of the low resistance potentiometer type pressure sensitive transducers having wide variations in resistance. The timing problems are avoided, as to the meter, by use of the full wave bridge rectifier circuits 18, 19, 20 and 21.

It is to be understood that any number of potentiometer type pressure transducers could be utilized along the length of the cable by simply connecting conductors 23 and 24 across the resistance portions of any additional pressure transducers and returning the wiper arms of the additional transducers to the ship in the manner described above. Additionally, it is to be understood that the pulsator of the present invention could be utilized with other measuring arrangements than that shown in FIG. 2. For example, output contacts 14c and 14d of pulsator 14 could be connected across the wiper arm and one side of the resistance portion of the potentiometer type pressure transducers and a voltmeter connected in parallel if a constant current D.C. power supply is used, or in series if a constant voltage D.C. power supply is used.

It is also to be understood that the pulsating direct current signal system of the present invention could be utilized to measure other underwater parameters than depth in a marine seismic survey system, and is not limited to just depth measurements.

While there has been described what is at present considered to be a preferred embodiment of this invention, it will be obvious to those skilled in the art that various changes and modifications may be made therein without departing from the invention, and it is therefore, intended to cover all such changes and modifications as fall within the true spirit and scope of the invention.

What is claimed is:

1. In a marine seismic survey system, a device for indicating an underwater parameter at at least one point along the length of the cable, comprising:
    (a) at least one parameter measuring device located at at least one point along the length of the cable;
    (b) means for supplying a pulsating, polarity-reversing direct current signal to the parameter measuring device; and
    (c) means responsive to the parameter measured by the parameter measuring device for providing an indication of the underwater parameter.

2. In a marine seismic survey system, a device for indicating an underwater parameter at at least one point along the length of the cable, comprising:
    (a) at least one parameter measuring device located at at least one point along the length of the cable;
    (b) first means for supplying a pulsating, polarity-reversing direct current signal to the parameter measuring device, said first means including:
        (1) means for supplying a direct current signal;
        (2) pulsating means for periodically reversing the polarity of the signal from the direct current supplying means to the parameter measuring device; and
    (c) second means responsive to the parameter measured by the parameter measuring device for providing an indication of the underwater parameter, the changes in the parameter causing the parameter measuring device to vary the magnitude of the pulsating, polarity-reversing direct current signal applied to the second means.

3. The system of claim 1 in which the parameter measuring device is a potentiometer type, absolute pressure transducer, so that a relatively substantial magnitude of current may be supplied ot the transducer.

4. The system of claim 2 in which the second means include a full wave rectifier bridge circuit for sensing the magnitude of the signal from the parameter measuring device.

5. The system of claim 4 in which the parameter measuring device is a potentiometer type, absolute pressure transducer, so that a relatively substantial magnitude of current may be supplied to the transducer.

6. In a marine seismic survey system, a device for indicating the depth of a cable at different points throughout the length of the cable, comprising:
    (a) a plurality of potentiometer type, absolute pressure transducers located at different points along the length of the cable;

(b) first means for supplying, in parallel, a pulsating, polarity-reversing direct current signal across the impedance portions of the pressure sensitive transducers; and
(c) second means responsive to the pressure indicated by each of the pressure sensitive transducers for providing an indication of the depth of each of the pressure sensitive transducers, said second means including:
   (1) full wave rectifier bridge means coupled to the wiper arms of each of the pressure sensitive transducers;
   (2) impedance means coupled to the rectifier bridge means and to the first means, the pressure transducers, impedance means, and rectifier bridge means comprising bridge circuit means so that the wiper arm of the pressure transducers will move upon changes in depth, thus causing the bridge circuit means to unbalance and provide an indication of the depth of the pressure transducers.

7. A method of indicating an underwater parameter at at least one point along the length of the cable in a marine seismic survey system, comprising:
(a) supplying a pulsating, polarity-reversing direct current signal to a pressure sensitive transducer located at at least one point along the length of the cable;
(b) modulating the pulsating, polarity-reversing direct current signal in accordance with the underwater parameter; and
(c) providing an indication of the underwater parameter in response to the modulated signal.

8. A method of indicating the depth of a cable at different points throughout the length of the cable in a marine seismic survey system, comprising:
(a) generating a direct current signal;
(b) periodically reversing the polarity of the direct current signal;
(c) supplying the periodic, polarity-reversing direct current signal to a potentiometer type, absolute pressure transducer; and
(d) providing an indication of the depth of the pressure transducer in response to the position of the wiper arm of the pressure transducer, said position being indicative of the pressure on the pressure transducer.

No references cited.

BENJAMIN A. BORCHELT, *Primary Examiner.*

P. A. SHANLEY, *Assistant Examiner.*